United States Patent Office 2,914,923
Patented Dec. 1, 1959

2,914,923

UNDERGROUND FLUID STORAGE CONTAINERS

George C. Harrison, St. Paul, Minn., assignor to Minnesota Mining and Manufacturing Company, St. Paul, Minn., a corporation of Delaware No Drawing. Application October 26, 1956
Serial No. 618,427

10 Claims. (Cl. 61—.5)

The present invention relates to a new type of storage container for various fluids, for example, for hydrocarbon gases such as propane, butane, and the like. This application is a continuation-in-part of my copending application Serial Number 294,957, filed June 21, 1952, and now abandonded.

Heretofore it has been conventional to store such hydrocarbon gases in generally cylindrical tanks having rounded ends. It has been found feasible commercially to build such tanks of steel. Such a conventional commercial tank will have a maximum storage capacity of about 25,000 gallons with a maximum tank diameter of about 10–12 feet, and, with the gauge of metal commonly employed, will withstand an internal pressure of 100 pounds per square inch. It is estimated that such a tank, installed at the present time, would cost roughly $15,-000.00.

Many standstone caves exist through the country, for example, along the Mississippi River, along the Ohio River, and elsewhere, conveniently located to boat and pipeline transportation, and of large volume capacity. These caves are normally sufficiently far under ground that the depth of earth or rock over them has sufficient weight to withstand a very high internal pressure.

If one brushes against the internal surface of a sandstone cave, he normally rubs off a considerable amount of sandstone. If he tries to coat such a surface with a hydrocarbon insoluble coating material such as polyalkylene polysulfide polymer ("Thiokol"), in the form of a water dispersion or in a solvent, the polymer tends to penetrate far into the walls of the sandstone cave, using excessive amounts of the treatment and ending up with a treatment which is not fluid tight.

The present invention provides sandstone and like caves which are effectively sealed against leakage by pressurized hydrocarbon fluids contained therein and which, thus, for the first time insofar as I am aware, are rendered suitable for the economical storage of such fluids. For example, a cave having a volume a great deal larger than the steel tank above-described can be sealed in accordance with the teachings hereof and rendered suitable for hydrocarbon fluid storage for just a few dollars cost. Also, provided herein are economical easily performed procedures for rendering sandstone and like caves hydrocarbon tight, and whereby hydrocarbon insoluble sealing coat materials such as are mentioned above can be employed to seal the walls of sandstone and like caves. I have found that I can stabilize the exposed inner surfaces of a cavity in the earth having porous walls of sandstone or the like by coating the walls with a treatment of water-dispersible impregnant which will penetrate the wall surface, remain hydrophilic and stabilize or bond together the sand particles of the wall to a desired depth from the surface while incompletely filling the interstitial openings between the particles. This hydrophilic binder serves also as a coagulant to coagulate and prevent the thereafter applied hydrocarbon-insoluble coating from penetrating deeply into the sandstone walls. The tough adherent hydrocarbon-insoluble film-forming sealing coat constituents then are applied to the surface to form a tough continuous firmly-anchored hydrocarbon-fluid impermeable film which completely fills to a substantial depth remaining intersitial openings between the bonded particles. Various materials, that is, both stabilizing binder-coagulants and hydrocarbon insoluble coating constituents, are suitable for use in the practice of my invention and those which I have found to be most successful will now be described for the sake of specific illustration.

Example

The surface of a cave having sandstone or like walls is first made ready by removing any obviously loose portions and also preferably removing any clay pockets or such like. I then spray the walls of the cave with a dilute aqueous solution of polyacrylic acid, for example, a 4 percent (by weight) solution of polyacrylic acid in water. The amount of the solution sprayed upon the walls will be dependent upon the depth to which it is desired to stabilize the wall surface. For example, if it were desired to stabilize it to a depth of one-half inch, one could readily calculate the volume of solution required per 100 square feet of wall surface by known or estimating the void space in the sandstone or other surfaces. For example, the void space in sandstone may be of the order of from 5 to 10%. To stabilize 100 square feet of such a wall surface to a depth of one-half inch, assuming a void space of 10%, would require roughly 0.4 of a cubic foot of the solution (assuming no loss in application). Such a solution may be applied in a customary manner with a conventional spray of any suitable type, and may be even applied from the nozzle of a garden hose. There is no objection to the use of additional quantities of such a stabilizing impregnant, except that it runs into additional materials cost. The cost of this stabilizing treatment, even if used generously, will only be of the order of two or three cents per square foot, or less.

After the inner walls of the cave, or the surface thereof, have been given such a stabilizing treatment or coating, I next apply a coating of constituents which will form a film over such treated surface, which film is resistant to solution in or attack by hydrocarbon gases. A preferred example of such a coating material is a water dispersion of a polyalkalene polysulfide polymer such as a magnesium hydroxide stabilized "Thiokol" polymer emulsion of commerce. This product is applied with a suitable spray or by brushing. A sufficient coating is applied so that, upon drying, a continuous film is left over the surface of the walls filling remaining unfilled interstitial openings between stabilized or bonded particles which form the walls to a substantial depth. Its thickness and depth of penetration can be varied within rather a wide range, depending upon the intended life of the cave as a storage container and depending upon the specific material intended to be stored in the cave. The "Thiokol" emulsion above mentioned was a material having roughly the consistency of natural rubber latex emulsion.

The opening to the cave may have a fluid-tight enclosure provided in any suitable manner. For example, a concrete bulkhead may be cast in place, to close the opening providing means for one to enter or leave the cave.

I have found that when added to the wall surfaces stabilized with the polyacrylic acid binder the "Thiokol" sealing coating constituents do not penetrate rapidly and wastefully into the wall. Instead there appears to be an inner-reaction between the several coating components, which causes the viscosity of the sealing constituents to increase fairly rapidly, that is, which causes the sealing constituents to coagulate, thereby resulting in the formation of the hydrocarbon impervious film in situ at or near the wall surface. The inter-reaction in the case of the materials of the present example appears to be between the polyacrylic acid and the magnesium hydroxide stabilizer whereby the polymer emulsion becomes unstable and coagulates. But for the presence of the requisite coagulating characteristics of the binder with respect to the sealing coating constituents, the latter would penetrate the wall so rapidly as to be completely economically unfeasible in the sealing of earth cavities, if ever successful. For instance, if the "Thiokol" emulsion of the present example is applied to the walls of the Mississippi River sandstone caves above referred to, application of more than a gallon of material per square foot of wall area without obtaining a hydrocarbon tight surface is usual.

The cost of the surface film, where a "Thiokol" polymer is used, will probably usually be several times the cost of the stabilizing treatment, but the overall cost is still very moderate, compared with the cost of the above-surface gas storage containers.

The application to the cave wall surfaces of other sealing compositions, which have been stabilized previously with a binder-coagulant suitably provides the hydrocarbon-tight caves of the present invention. Any film-forming material is suitable which of itself forms a tough strong hydrocarbon-fluid impermeable film when applied to a continuous surface and which coagulates when constituents thereof contact the particular stabilizing binder employed. Since there is some interdependence between the sealing coat constituents and the underlying stabilizing binder-coagulant, some sealing coat materials may be suitable in the sealing of caves where one type of binder-coagulant is employed and unsuitable where another is employed. A simple test to be described hereinafter will aid in the selection of proper combinations of materials.

Another composition which serves highly satisfactorily as a sealing coat in conjunction with the polyacrylic acid binder-coagulant includes a coating composition consisting of 10 parts by weight of epoxide resin such as that commercially available under the trade name "Bakelike BR–18774," which resin is the reaction product of Bisphenol–A and epichlorohydrin having an epoxy number of 192 grams per epoxide equivalent and a hydroxide number of 80 grams per hydroxide equivalent, and 1 part by weight of diethylene triamine accelerator. Preferably the composition also contains about 4 parts by weight of a liquid chlorinated biphenyl plasticizer such as the "Arochlor 1254" available in commerce. This serves as a non-volatile diluent and reduces the viscosity of the composition as it is applied to a more penetrative and easily spreadable or sprayable state. The several constituents of the composition are intimately mixed together just prior to application thereof (due to the autogenous curing characteristics of the composition) and the mixed composition is then applied to the previously stabilized cave walls by spraying or brushing.

This 100 percent solids plasticized epoxide-amine composition generally will be sufficiently fluid to initially penetrate the still porous walls fairly rapidly. Where it is not so fluid however, as for example, might occur where the surrounding temperatures in the cave are rather low, somewhat higher proportions of the plasticizer can be employed to lower the viscosity of the composition; or the coating composition may be dissolved in a suitably inert volatile solvent, e.g. methyl ethyl ketone, which volatizes soon after application.

When the epoxide-amine composition is applied to the polyacrylic acid stabilized walls it initially penetrates the porous walls fairly rapidly. However, as the composition contacts the polyacrylic acid the viscosity of the composition increases and penetration does not continue deeply into the wall. It is believed that this coagulation is caused by partial reaction of the amine with the polyacrylic acid to which the epoxide resin, in turn, reacts and has a rather high affinity. The resin composition then in due time cures in situ and forms a tough hydrocarbon-fluid impervious film at or near the wall surface.

Another example of a coating composition, which can be employed in conjunction with the polyacrylic acid stabilizing treatment above described in sealing cave walls by my novel procedures, is a dilute aqueous solution (for example 10–20% solids by weight) of ordinary commercial hide glue. However, the hide glue is itself rapidly reactive with the polyacrylic acid stabilizing treatment, and when employed as the single solids constituent of the sealing coat it gels almost instantaneously in contact with the acid. A relatively small amount of ammonia is therefore necessary in the coating composition as a retardant. In the neighborhood of 1–5 percent by weight of ammonia based upon the hide glue is employed, the optimum amount being that which just prevents the coating composition from gelling at the wall surfaces, while yet allowing a relatively rapid reaction between the stabilizing binder-coagulant and the hide glue so as to thereby prevent undesirably rapid penetration of the latter into the wall. The generally proper amount of ammonia to be used is easily determined prior to the application of the coat to the cave wall by test procedures to be described shortly. If desired, the ammonia may be added with the polyacrylic acid in the stabilizing treatment rather than as a constituent of the sealing coat.

Aqueous emulsions of vinyl acetate also provide useful coating compositions in conjunction with the polyacrylic acid stabilizing binder-coagulant. In this instance the exact mechanism by which the vinyl acetate is caused to coagulate by the polyacrylic acid is not fully understood. However, such coagulation does take place, particularly where high solids emulsions, e.g. in the order of 50 percent by weight, are used. Other compositions which also appear to be interesting as coating compositions for polyacrylic acid stabilized wall surfaces include compositions of water-soluble urea-formaldehyde resins containing ammonium chloride or like catalyst, the latter in an amount of about 3 percent by weight of resin, and also compositions of melamine-formaldehyde resins containing a similar amount of aluminum chloride or like catalyst.

Various stabilizing binder-coagulants may be employed in the preliminary treatment applied to the wall surfaces. It is found in general that any hydrophilic initially water-dispersible binders are suitable providing they have the characteristic of being a coagulant for the after-applied sealing coat composition. Due to its being a hydrophilic binder, the particles of the cave walls are firmly stabilized and rendered abrasion-resistant upon treatment therewith. Being also a coagulant, the binder causes the after-applied sealing coat composition to form in situ at or near the wall surface. Preferably, though not essentially, film-forming (that is, capable of being cast into a film) hydrophilic organic acid polymers, and in particular carboxylic acid polymers, are used. Water-soluble polyacrylic acid is favored by me as a hydrophilic initially water-dispersible binder-coagulant. However, in addition solutions of methacrylic acid may be employed, although relatively more amounts thereof may be necessary for a given job than would be the case if polyacrylic acid was used. Various carboxylic acid derivatives of cellulosic materials, including carboxymethyl cellulose, carboxymethyl hydroxyethyl cellulose provide suitable stabilizing binder-coagulants. Certain maleic acid-vinyl acetate copolymers, which are soluble either in water or in slightly alkaline aqueous solutions, have also proven interesting. Other organic acid materials usefully serve as binder-coagulants. For example, certain sulfonic acid compositions can be used, such as the water-soluble hydrophilic film-forming sulfonic esters of the polyethylene glycols, specifically the substantially completely sulfonated derivative of polypropylene glycol. Certain inorganic materials can serve as the binder-coagulant hereof. Notably, acid-acting phosphate binders in water dispersions, e.g. aqueous solutions of phosphoric acid, can be employed.

As previously mentioned, not all binders which operably serve as coagulants for some sealing coat compositions do so for all sealing coat compositions, and vice versa. By way of illustration, although the "Thiokol" sealing coat is suitably coagulated by all of the several binders specifically mentioned herein, the vinyl acetate emulsion sealing composition and the ammonia-hide glue sealing composition do not appear to be operable with all binder-coagulants. These latter two compositions are coagulated quite well, however, by the polyacrylic acid binder.

A simple test can be utilized to determine the coagulative characteristics of a proposed binder-coagulant relative to any given sealing coat composition which it might be desired to employ. By the test, the qualities of such proposed material as a binder or wall stabilizer can also qualitatively be determined. The procedure is as follows: A quantity of loose sand, preferably roundstone sand such as beach sand, is packed firmly into a Buchner-type funnel or similar piece of apparatus in the bottom of which has been previously positioned a piece of rather coarse porous filter paper. Thus, surrounding air has access to the surface of the sand contacting the filter paper, which surface is opposite the externally exposed sand surface. Thus no air will be entrapped within the sand to thereby retard penetration by the compositions to be added. The proposed aqueous dispersion of binder-coagulant is then applied to the exposed sand surface and allowed to seep into the sand. Sufficient of this binder dispersion is employed so that it penetrates the sand to a depth of at least one-half inch or more. The contents of the funnel are then allowed to set or dry for a few hours, for example, overnight. At this point the treated sand can easily be observed for stabilization and surface abrasion resistance. If the surface is sufficiently abrasion-resistant such that particles cannot be removed by rubbing the exposed treated sand surface with the palm of the hand, and is additionally quite resistive to removal of particles upon a "scratching" of the surface with a nail or one's fingernail, the binder is a sufficient stabilizer for the purposes hereof. Depth of penetration can be determined by removing the sand from the funnel and then breaking the stabilized portion apart, which portion should be unified and hard. The film-forming sealing coat composition is then applied by spraying or spreading to the exposed stabilized sand surface, preferably at a viscosity just low enough such that the composition will initially penetrate the sand surface without running off when the surface is disposed vertically. If the sealing coat composition is observed to initially penetrate and then very shortly thereafter is observed to form what appears to be a continuous film over the exposed surface, the coagulative effect caused by the first applied treatment is adequate.

The permissive concentrations of the treatments is dependent primarily on the viscosity of the composition employed and may be varied widely. With respect to the application of the dispersion of the binder-coagulant, I prefer to employ a concentration having a viscosity low enough such that the entire amount of dispersion to be applied to a given area for proper penetration may be applied thereto at one time and the same will penetrate the surface before it runs off the surface without penetrating. Lower concentrations may of course be used but then the total amount of dispersion applied is greater for the application of a given amount of binder-coagulant solids. In any event, the concentration will be low, e.g. the polyacrylic acid solution of the preceding specific example had a concentration of about four percent.

The viscosity of the sealing coat composition as applied is similarly governed, but an additional factor should be considered in this regard. Depth of penetration of the sealing coat constituents before coagulation thereof occurs may be controlled to an extent by the fluidity of the sealing composition. For example, if the coagulative effect of the particular binder-coagulant employed upon the particular sealing coat constituents used is quite rapid, it may be advisable to employ the sealing composition in quite fluid form. Thus penetration by the sealing coat proceeds to a greater depth before coagulation diminishes or precludes further penetration than would occur with a more viscous and hence more slowly-penetrative composition. As above discussed with respect to the hideglue polyacrylic acid coatings combination, depth of sealing coat penetration before coagulation may additionally or alternatively be controlled with appropriate use of coagulation retardants.

It is usually unnecessary for the depth of penetration by the sealing coat constituents to exceed ¼–⅜ inch. Further, it is unnecessary and indeed generally wasteful, though not deleterious, to allow sealing coat penetration to proceed to a depth beyond that of stabilization. The amount of sealing coat solid constituents necessary per 100 square feet of wall area to fill remaining interstitial openings between wall particles to the desired depth may be estimated on the basis of initial percentage of wall void space. This initial percentage is substantially unaffected by the presence of the binder-coagulant, which actually fills few if any of the interstitial openings.

It is generally sufficient if the wall surfaces are stabilized to a depth beyond about ½ inch. Cave walls stabilized to this depth and to which the overlying sealing coat has been applied will be sufficiently hard and strong to withstand storage pressures up to and beyond 150 pounds per square inch. However, in sandstone caves having walls which are naturally quite soft and infirm such that particles can easily be scraped away with the hands to an appreciable depth, say ¼ inch, stabilization to a depth at least up to about 1½–2 inches is advisable. As a practical matter I have found that it is economically as convenient, when application time and labor cost are included, to stabilize to depths of about 1½ inches as it is to stabilize to lesser depths; and thereby a generous factor of safety is conveniently provided in the average cave.

I have found some advantage in most applications to include some filler material in my polyacrylic acid dispersion or equivalent. One suitable and cheap filler material is a product known commercially as "Cellite 110," which is a cheap, siliceous pigment-type paint filler. Other fillers, such as fuller's earth, diatomaceous earth, or such like, could also be used.

I have also found it to be of advantage to have my stabilizing impregnant composition a distinctive color, to contrast with the wall surface of the cave, for example, a green or a blue in the case of a sandstone cave, so as to make it easy to determine which portions of the wall have been treated to stabilize them. It is likewise desirable to have the sealing coat composition which will be in contact with the gases or fluids to be stored, of a different color, again so that it will be easy to see when a continuous film of such "Thiokol" coating or equivalent has been applied over the stabilized surface. It is apparent that this coloring of the materials has advantages as well when the above-described experimental test is employed.

What I claim is:

1. A container for hydrocarbon and other fluids which comprises a cavity in the earth having porous interior walls of sandstone, limestone or such like, the particles forming said walls being stabilized to a substantial depth with a hydrophilic initially water-dispersible stabilizing binder-coagulant, the interstitial openings between said particles being incompletely filled by said binder-coagulant, and an overlying in situ coagulated strong continuous firmly-anchored hydrocarbon insoluble sealing coat filling remaining unfilled interstitial openings between bonded wall particles which is resistant to solution in and penetration by hydrocarbon fluids.

2. An article having an initially porous sandstone or like surface rendered impervious to hydrocarbon fluids, the particles forming said surface being stabilized to a substantial depth with a hydrophilic initially water-dispersible stabilizing binder-coagulant, the interstitial openings between said particles being incompletely filled by said binder-coagulant, and an overlying in situ coagulated strong continuous firmly-anchored hydrocarbon insoluble sealing coat filling remaining unfilled interstitial openings between bonded particles which is resistant to solution in and penetration by hydrocarbon fluids.

3. A container for hydrocarbon and other fluids which comprises a cavity in the earth having porous interior walls of sandstone, limestone or such like, the particles forming said walls being treated to a substantial depth with a hydrophilic initially water-dispersible stabilizing binder-coagulant to stabilize the surfaces of said walls so as to resist removal of mild abrasion of said particles, the interstitial openings between said particles being incompletely filled by said binder-coagulant, and an overlying in situ formed strong continuous firmly-anchored hydrocarbon insoluble sealing coat filling remaining unfilled interstitial openings between bonded wall particles which is resistant to solution in and penetration by hydrocarbon fluids.

4. A container for hydrocarbon and other fluids which comprises a cavity in the earth having porous interior walls of sandstone, limestone or such like, the particles forming said walls being treated to a substantial depth with a hydrophilic initially water-dispersible stabilizing binder-coagulant to stabilize the surfaces of said walls so as to resist removal on mild abrasion of said particles, the interstitial openings between said particles being incompletely filled by said binder-coagulant, and an overlying in situ formed strong continuous firmly-anchored hydrocarbon insoluble sealing coat filling remaining unfilled interstitial openings between bonded wall particles which is resistant to solution in and penetration by hydrocarbon fluids, said binder-coagulant being a coagulant for said sealing coat in liquid form.

5. A container for hydrocarbon and other fluids which comprises a cavity in the earth having porous interior walls of sandstone, limestone or such like, the particles forming said walls being stabilized to a substantial depth with a hydrophilic initially water-soluble film-forming polymeric organic stabilizing binder-coagulant, the interstitial openings between said particles being incompletely filled by said binder-coagulant, and an overlying in situ coagulated strong continuous firmly-anchored hydrocarbon insoluble sealing coat filling remaining unfilled interstitial openings between bonded wall particles which is resistant to solution in and penetration by hydrocarbon fluids.

6. A container for hydrocarbon and other fluids which comprises a cavity in the earth having porous interior walls of sandstone, limestone or such like, the particles forming said walls being stabilized to a substantial depth with a hydrophilic initially water-soluble film-forming polymeric organic stabilizing binder-coagulant, the interstitial openings between said particles being incompletely filled by said binder-coagulant, and an overlying in situ coagulated strong continuous firmly-anchored hydrocarbon insoluble organic polymeric sealing coat filling remaining unfilled interstitial openings between bonded wall particles which is resistant to solution in and penetration by hydrocarbon fluids.

7. A container for hydrocarbon and other fluids which comprises a cavity in the earth having porous interior walls of sandstone, limestone or such like, the particles forming said walls being stabilized to a substantial depth with a hydrophilic initially water-soluble polyacrylate stabilizing binder-coagulant, the interstitial openings between said particles being incompletely filled by said binder-coagulant, and an overlying in situ coagulated strong continuous firmly-anchored hydrocarbon insoluble sealing coat filling remaining unfilled interstitial openings between bonded wall particles which is resistant to solution in and penetration by hydrocarbon fluids.

8. A reservoir for storing hydrocarbon fluids which comprises a cavity in the earth having walls of sandstone, the interior wall areas of such cavity being stabilized to a substantial depth by a strongly adherent stabilizing impregnant formed by application to said areas of a dilute aqueous solution of polyacrylic acid, thereby to render the surfaces of said walls resistant to the removal of grains or particles therefrom on mild abrasion, the interstitial openings between grains or particles forming said wall areas being incompletely filled by said impregnant, and an overlying in situ formed strong firmly-anchored substantially continuous polyalkylene polysulfide film or coating filling remaining unfilled interstitial openings between said grains or particles which is resistant to solution in or penetration by hydrocarbon fluids.

9. A method of rendering a porous sandstone, limestone or such like surface impervious to hydrocarbon fluids, the steps comprising stabilizing the particles forming said surface to a substantial depth by applying to said surface an aqueous dispersion of a hydrophilic binder-coagulant, said dispersion penetrating said surface to a substantial depth, and thereafter sealing said surface by applying over the stabilized particles a liquid hydrocarbon-impervious film-forming composition, said composition being coagulable by said binder-coagulant when they contact one another by the coagulating test herein described, said composition penetrating the wall surface to a substantial depth before being coagulated to form a continuous firmly-anchored hydrocarbon insoluble sealing coat.

10. A method of rendering a porous sandstone, limestone or such like surface impervious to hydrocarbon fluids, the steps comprising stabilizing the particles forming said surface to a substantial depth by applying to said surface an aqueous solution of polyacrylic acid, said solution penetrating said surfaces to a substantial depth, and thereafter sealing said surface by applying over the stabilized particles an aqueous magnesium hydroxide containing emulsion of a polyalkylene polysulfide polymer, said emulsion penetrating the wall surface to a substantial depth before being coagulated to form a continuous firmly-anchored hydrocarbon insoluble sealing coat.

References Cited in the file of this patent

UNITED STATES PATENTS 2,670,048    Menaul    Feb. 24, 1954

OTHER REFERENCES

Petroleum Engineer, Reference Annual, 1954, pages E-21 and E-22.